United States Patent
Huber

[19]

[11] Patent Number: 6,139,728
[45] Date of Patent: Oct. 31, 2000

[54] APPARATUS FOR COLLECTING AND REMOVING SOLID PARTICLES FROM A FLOWING FLUID

[75] Inventor: Hans Georg Huber, Berching, Germany

[73] Assignee: Hans Huber GmbH Maschinen-und Anlagenbau, Germany

[21] Appl. No.: 09/474,898

[22] Filed: Dec. 22, 1999

[30] Foreign Application Priority Data

May 3, 1999 [DE] Germany ............... 199 20 074

[51] Int. Cl.[7] ...................................... E02B 5/08
[52] U.S. Cl. .................. 210/154; 210/155; 210/159; 210/162
[58] Field of Search ................... 210/154, 155, 210/159, 162

[56] References Cited

U.S. PATENT DOCUMENTS

| | | |
|---|---|---|
| 1,773,576 | 8/1930 | Downes . |
| 5,098,561 | 3/1992 | Grabbe . |
| 5,770,055 | 6/1998 | Wallander et al. . |

FOREIGN PATENT DOCUMENTS

| | | |
|---|---|---|
| 0 221 991 B1 | 5/1987 | European Pat. Off. . |
| 0 682 551 B1 | 11/1995 | European Pat. Off. . |
| 40 01 859 C 2 | 8/1996 | Germany . |
| 197 14 089 A 1 | 8/1998 | Germany . |
| WO 91/14048 | 9/1991 | WIPO . |
| 95/19471 | 7/1995 | WIPO . |

*Primary Examiner*—Thomas M. Lithgow
*Attorney, Agent, or Firm*—Thomas, Kayden, Horstemeyer & Risley, L.L.P.

[57] ABSTRACT

An apparatus for collecting and removing solid particles from a flowing fluid (5) includes a grid unit (6) including a plurality of stationary bars (1) being arranged to form a stationary bar unit (3). Each of the stationary bars (1) includes a plurality of steps (8). A plurality of movable bars (2) is arranged to form a movable bar unit (4). Each of the movable bars (2) includes a plurality of steps (8). The stationary bars (1) and the movable bars (2) are arranged side by side to alternate. A first parallelogram unit (11, 12, 13, 14, 17) is connected to stationary bearings (11, 12) to be pivotable in a plane about the pivot axes of the stationary bearings (11, 12) with respect to the stationary first bar unit (3). A second parallelogram unit (15, 16, 18, 19, 20, 21) is operatively connected to the first parallelogram unit and to the movable second bar unit (4). The first and second parallelogram unit (11, 12, 13, 14, 17, 15, 16, 18, 19, 20, 21) are designed and arranged to guide the movable second bar unit (4) in a plane with respect to the stationary first bar unit (3). A drive (23) is operatively connected to the movable second bar unit (4) to move the movable second bar unit (4) along a closed path of movement (32). The drive (23) is operatively connected to the second bar unit (4).

20 Claims, 5 Drawing Sheets

APPARATUS FOR COLLECTING AND REMOVING SOLID PARTICLES FROM A FLOWING FLUID

CROSS REFERENCE TO RELATED APPLICATIONS

This application claims the benefit of co-pending German Patent Application No. 199 20 074.2 entitled "Vorrichtung zum Abscheiden und Herausfördern von Abscheidegut aus einer strömenden Flüssigkeit, insbesondere Abwasser", filed on May 3, 1999.

FIELD OF THE INVENTION

The present invention generally relates to an apparatus for collecting and removing solid particles from a flowing fluid, especially from waste water. Such an apparatus is also called a separating grid or a step screen. The apparatus includes a stationary bar unit and a movable bar unit. More particularly, the present invention relates to an apparatus for collecting and removing solid particles from a flowing fluid including two parallelogram units and one single drive for guiding and moving the movable bar unit along a path of movement.

BACKGROUND OF THE INVENTION

Apparatuses for collecting and removing solid particles from a flowing fluid are commonly known. They are used in sewage treatment plants in which domestic or industrial sewage is cleaned. They are also used to clean washing water or process water or to screen mud or the like.

An apparatus for collecting and removing solid particles from a flowing fluid is known from European Patent No. EP 0 221 991 B1. The apparatus includes a first set of stationary bars and a second set of movable bars. The stationary bars and the movable bars are alternately arranged, and they include steps at their side facing the flowing fluid. The steps include a substantially horizontal skeleton portion and a substantially vertical rising portion in a way that the steps form a rectangular stepped curve. The movable bars are interconnected to form a movable bar unit being suspended at and connected to two eccentric discs. The first eccentric disc is directly connected to the movable bar unit. The second eccentric disc uses a rod to transmit the movement onto the movable bar unit. The two eccentric discs are coupled, and each of them forms a drive. In this way, the movable bar unit is guided along a closed circular path with respect to the stationary bars in a forced manner. The movable bar unit is guided along one single circular path at all of its locations. The upwardly directed component of movement of the circular path is slightly greater than the height of the steps of the stationary bars. The movable bars together with side walls form a unit. The side walls are used to transmit the circular movement onto the bars. The suspension of the movable bar unit is rather complicated, and it requires a separation of the drive via two separate eccentric discs and the corresponding suspension at two places.

Another separating similar grid is known from European Patent No. EP 0 682 551 B1. The separating grid includes a stationary bar unit and a movable bar unit. A driving mechanism is arranged above the flowing fluid to move the movable bar unit along a closed and substantially circular path of movement. The movement includes a vertical component of movement which is greater than the height of the steps of the bars. The drive for the movable bar unit is designed such that the movable bar unit in its upper region is exactly guided on a circular path. The circular movement is provided by an eccentric device. The drive also includes a pulling element with a connecting mechanism providing a path of movement being similar to a circuit. In this way, the movable bar unit at each point is differently moved about the height of the bars. Each step is moved on a different path of movement. The path of movement is closed, and it is very similar to a circuit. The circuit includes a vertical component of movement the value of which is greater than the height of the steps of the bars. With this arrangement, the solid particles are not correctly transported in an upward direction. The conveying effect is different at all steps.

A step screen is known from German Patent Application No. DE 197 14 089 A1. The step screen includes a first bar unit including stationary and spaced apart bars and a second bar unit including movable bars. All bars include a majority of steps at their surface facing the flowing fluid. The steps include a horizontal skeleton portion and a vertical rising portion. The movable second bar unit is driven along a closed path of movement in the plane of main extension of the bars. The upwardly directed component of movement of the path of movement is slightly greater than the vertical height of the steps of the bars. The drive includes two separately controllable actuating drives driving the movable bar unit in two different actuating directions. In this way, the adjustment of the movable bar unit is more variable. The path of movement surrounds a surface, and it is divided into substantially linear sections of the movement, the sections preferably being vertical and linear. The actuating drives are arranged to be vertical and horizontal. Consequently, the circular movement known from the above described prior art is replaced by a rectangular movement.

SUMMARY OF THE INVENTION

Briefly described, the present invention provides an apparatus for collecting and removing solid particles from a flowing fluid. The apparatus includes a grid unit including a plurality of stationary first bars being arranged to form a stationary first bar unit. Each of the stationary first bars includes a plurality of steps facing the flowing direction of the fluid. Each of the stationary first bars includes a plurality of movable second bars being arranged to form a movable second bar unit. Each of the movable second bars includes a plurality of steps facing the flowing direction of the fluid. The stationary first bars and the movable second bars are arranged side by side to alternate. A plurality of stationary bearings each having a pivot axis is arranged on a stationary portion of the apparatus. A first parallelogram unit is connected to the stationary bearings to be pivotable about the pivot axes of the stationary bearings with respect to the stationary first bar unit. A second parallelogram unit is operatively connected to the first parallelogram unit and to the movable second bar unit. The first and second parallelogram unit are designed and arranged to guide the movable second bar unit in a plane with respect to the stationary first bar unit. A drive is operatively connected to the movable second bar unit to move the movable second bar unit along a closed path of movement. The drive is operatively connected to the second bar unit.

The present invention also provides a separating grid for collecting and removing solid particles from flowing waste water. The separating grid includes a first parallelogram unit including two first stationary bearings each having a pivot axis. Two first parallelogram rods each are connected to one of the first stationary bearings to be pivotable in a plane about the pivot axes of the stationary bearings. A coupling bar operatively couples the two first parallelogram rods. Two first joints are connected to the coupling bar, each of the first joints being connected to one of the first parallelogram rods. A second parallelogram unit includes two second joints being connected to the movable second bar unit. Two second parallelogram rods each are connected to one of the second joints and each are operatively connected to the coupling bar. The first and second parallelogram unit is designed and arranged to guide the movable second bar unit in a plane with respect to the stationary first bar unit. A drive moves the second bar unit with respect to the stationary first bar unit along a closed path of movement. The path includes an upwardly directed component of movement being greater than the vertical height of the steps of the first and second bars to transport items or solid particles from a first step in an upward direction to a second step. The drive is operatively connected to the second bar unit.

The present invention is based on the concept of suspending or supporting the movable bar unit in a special way such that the movable bar unit is limited to a planar movement parallel to itself. This limited movement of the movable bar unit with respect to the stationary bar unit is achieved by two parallelogram units being arranged in series. The first parallelogram unit includes two first parallelogram rods being suspended or supported in stationary bearings on the stationary bar unit. The two first parallelogram rods have the same length, and they preferably carry two joints at their ends. The two joints and the two first parallelogram rods, respectively, are connected by a coupling bar. Consequently, the two stationary bearings and the two joints form four turning points of one (the first) parallelogram unit. The coupling bar is limited to a planar movement parallel to itself along a circular path about the axes of the stationary bearings. A second parallelogram unit is connected to the coupling bar and to the two first parallelogram rods of the first parallelogram unit. It may be also connected to the movable joints of the second parallelogram unit. The second parallelogram unit includes two second parallelogram rods having the same length. The length of the two second parallelogram rods of the second parallelogram unit may differ from the length of the two first parallelogram rods of the first parallelogram unit. The second parallelogram unit including two second parallelogram rods also has four turning points being distributed, arranged and interconnected like a parallelogram. The two first turning points are preferably formed by the movable joints, and they are connected by the coupling bar. The two second turning points are preferably formed by two joints, and they are connected by the movable bar unit. The movable bar unit forms the second coupling bar. The two parallelogram units being arranged in series may also be called one double parallelogram unit. With this double parallelogram suspension, it is ensured that the movable bar unit is exclusively moved parallel to itself Consequently, each step at each place of the movable bar unit is guided along the same common path of movement such that the conveying conditions are identical at all locations of the apparatus. On the other hand, the novel suspension makes it possible to move the movable bar unit along any desired path of movement. Such a movement includes a circular path being easy to realize and an elliptical path of movement or a path of movement being similar to the shape of an ellipse. The movement of the drive determines the shape of the path of movement. The novel apparatus only requires one single drive preferably directly engaging the movable bar unit to transmit the desired path of movement onto all locations of the movable bar unit. With the novel design, it is not necessary to separate the drive into two eccentric discs. It is not necessary to provide and coordinate two different drives.

The novel suspension provides a universally usable suspension for the movable bar unit. This portion of the apparatus may be combined with drives including different paths of movement such that comparatively complicated paths of movement may be realized. Each step of the apparatus is always guided along parallel identical paths of movement.

There is a number of possibilities of realizing the one single drive. It is especially easy to design the drive as a crank mechanism. Such a crank mechanism includes a circular path of movement determining the circular path of movement of the movable bar unit. Such a drive is especially advantageous in case the stationary bar unit and the movable bar unit are arranged at an angle of approximately 45 degrees and the skeleton portion and the rising portion of the steps are approximately identical. Such a crank mechanism is rather easy to realize. For example, it may be realized by an electric motor including a flange-mount cam disc, a turning arm or the like. Another possibility of realizing the drive is to design the drive as curved path drive. In this way, a path of movement being different from a circular movement, especially elliptical movements or movements being similar to the shape of an ellipse, may be realized. Such a path of movement is designed and arranged such that the upwardly directed conveying component of the path of movement being greater than the height of the steps is coordinated with the shape of the steps. In this way, the main axis of the elliptical movement is arranged with respect to the vertical direction. It is to be understood that the apparatus may also be arranged in a flume or a raceway through which the fluid flows at an angle other than 45 degrees, for example at an angle in a range of 40 degrees to 80 degrees. The skeleton portions may have different dimensions than the rising portions.

It is advantageous if the two first parallelogram rods at their pivotable ends are connected by a coupling bar. It is to be understood that the coupling bar may also be connected to a different location of the two first parallelogram rods meaning not to the ends of the rods. The two bearings being required at the coupling bar may be connected to the pivotable ends of the parallelogram rods to use the entire length of the two first parallelogram rods. In this way, the two first parallelogram rods and the coupling bar form the first parallelogram unit. It is also possible that the two first parallelogram rods are connected to the two second parallelogram rods by common joints. The common joints have multiple functions, and the common suspension is especially simple.

The one single drive may be directly connected to the movable second bar unit. For example, it may be connected to protrusions being arranged at some of the movable bars. These protrusions may be also formed by the side walls of the movable bar unit. It is also possible that the one single drive is connected to one of the two second parallelogram rods, and thus indirectly to the movable bar unit. With this arrangement, there is no need for the movable bars of the movable bar unit to have protrusions or the like. The drive directly engages the joints being formed at one of the two second parallelogram rods.

It is to be understood that the parallelogram rods of each parallelogram unit or parallelogram suspension should have the identical length. Additionally, it is possible that the two first parallelogram rods have the same length as the two second parallelogram rods. In case the two second parallelogram rods are connected to each other by the movable bar unit, there is no need for a separate arrangement of a second coupling bar for the two second parallelogram rods.

The steps may include skeleton portions and rising portions of the same dimensions. The bar units may be arranged to be inclined at an angle of 45 degrees. This arrangement makes sense in connection with a circular path of movement.

The features and advantages of the present invention will become apparent to one with skill in the art upon examination of the following drawings and the detailed description. It is intended that all such features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
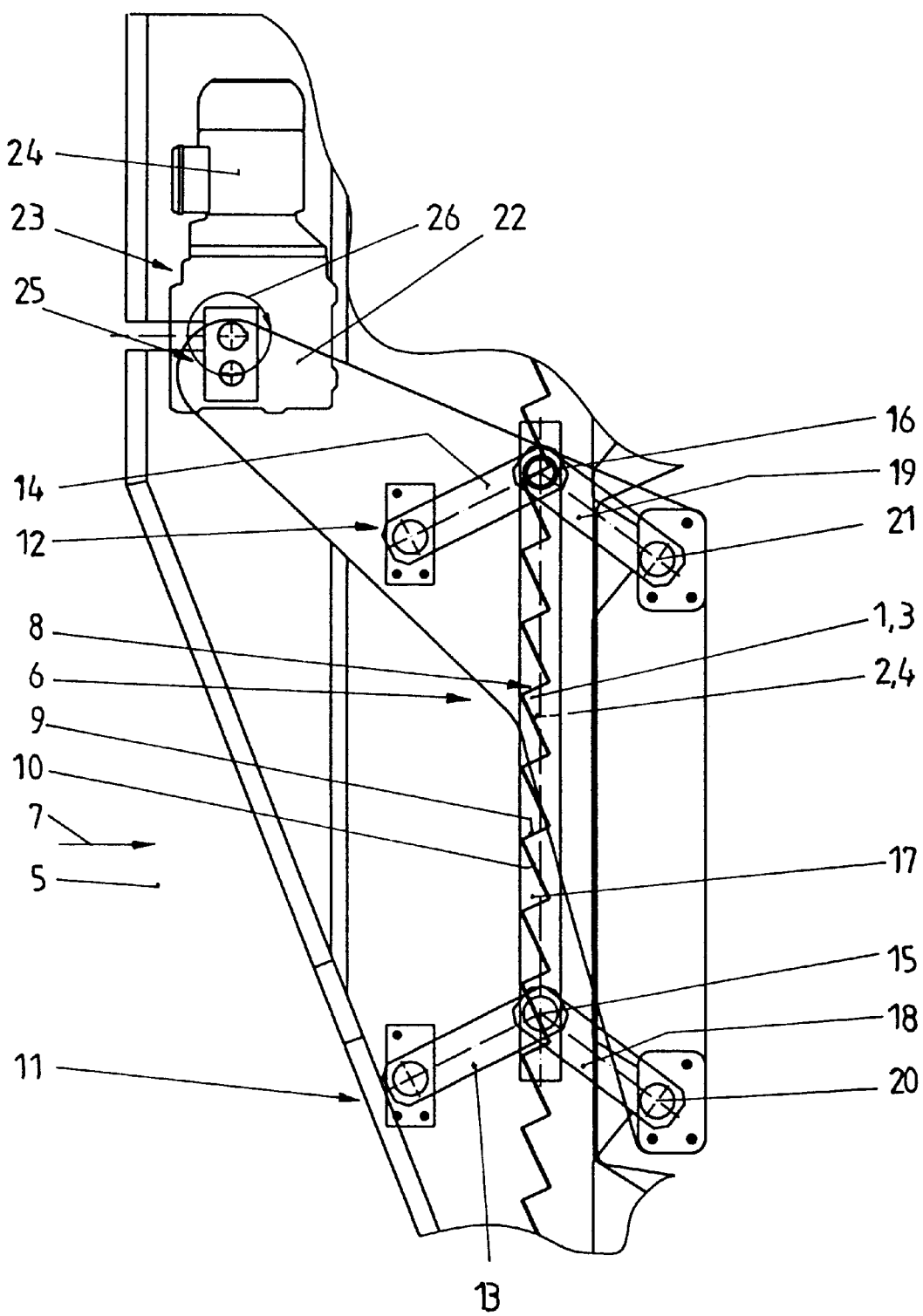
FIG. 1 is a schematic side view of an apparatus for collecting and removing solid particles from a flowing fluid.

Referring now in greater detail to the drawings, FIG. 1 illustrates a side view of a stationary bar 1. Separating grids for collecting an removing solid particles from a flowing fluid include a plurality of such stationary bars 1 being arranged in a spaced apart manner with respect to one another in a direction perpendicular to the plane of illustration of FIG. 1. Thus, FIG. 1 only shows one stationary bar 1. The other stationary bars 1 are arranged such that their outlines are covered by the illustrated stationary bar 1. A movable bar 2 is arranged between two stationary bars 1 in the direction perpendicular to the plane of illustration. The outline of the movable bars 2 is also covered by the outline of the illustrated stationary bar 1 in the starting position of the apparatus as illustrated in FIG. 1. The stationary bars 1 are designed and arranged to form a stationary first bar unit 3. The movable bars 2 are designed and arranged to form a movable second bar unit 4. When the separating grid is driven, the movable second bar unit 4 including the movable bars 2 is moved parallel to its plane of main extension, i.e. in parallel planes to the plane of illustration of FIG. 1. The two bar units 3 and 4 are part of a grid unit 6 contacting the fluid 5 to be cleaned from solid particles. The grid unit 6 is arranged to be inclined in the flowing direction 7 of the fluid 5 with respect to the grid unit 6 as indicated by an arrow.

The bars 1 and 2 include steps 8 being arranged at their side facing the fluid 5 according to the flowing direction 7. Each step 8 includes a skeleton portion 9 and a rising portion 10. In the illustrated embodiment of FIG. 1, the skeleton portion 9 is arranged at an angle with respect to the flowing direction 7 of the fluid 5. The skeleton portion 9 is inclined with an angle to increase in the flowing direction 7 of the fluid 5. Nevertheless, it is also possible to arrange the skeleton portion 9 to be horizontal. Anyway, the part of the step 8 being substantially horizontal is designated as the skeleton portion 9. The part of the step 8 being substantially vertical is designated as the rising portion 10. The rising portion 10 may be arranged to be vertical. However, the rising portion 10 may be also arranged to be inclined, as it is illustrated in FIG. 1. It is also possible that the step 8 has a curved or bent shape in the region of the rising portion 10. The rising portion 10 is arranged at 90 degrees with respect to the skeleton portion 9. Such an arrangement occurs when the steps 8 are designed and arranged in a rectangular shape. Such a design of the steps 8 does not include any undercuts. The steps 8 may also be designed to include undercuts in the horizontal and/or in the vertical direction. Such undercuts are, for example, desirable to transport bigger items from one step 8 to the next step 8 in an upward direction.

A first parallelogram unit or suspension element is arranged in stationary bearings 11 and 12 having pivot axes extending perpendicular to the plane of illustration. The stationary bearings 11 and 12 are fixedly connected to the stationary frame of the apparatus. The first parallelogram unit includes two first parallelogram rods 13 and 14. The two first parallelogram rods 13 and 14 have the same length. Two Joints 15 and 16 being interconnected by a coupling bar 17 are connected to the pivotable ends of the two first parallelogram rods 13 and 14. The distance between the joints 15 and 16 corresponds to the effective length of the coupling bar 17 and to the distance between the axis of the bearings 11 and 12.

A second parallelogram unit or suspension element for the movable bar unit 4 is connected to the first parallelogram unit. The second parallelogram unit includes two second parallelogram rods 18 and 19. The second parallelogram rods 18 and 19 have an identical length. They are supported or suspended by the two joints 15 and 16, respectively, and at their other ends they are further connected to joints 20, and 21, respectively. The joints 20 and 21 provide the operational connection to the movable bar unit 4. The joints 20 and 21 are connected to the movable bars 2 of the movable bar unit 4. They usually engage both outermost bars 2. These two movable bars 2 may include a protrusion or an arm 22 to which one single drive 23 is operatively connected. The drive 23 may include an electric motor 24 and a crank (not illustrated). The crank may also be designed as a cranked shaft, as an eccentric cam, or the like. In this way, there may be a crank mechanism 25.

Due to the special design of the suspension arrangement of the movable bar unit 4, the movable bars 2 and the entire mobile bar unit 4 is guided in a plane parallel to itself. Without the drive 23 the movable bar unit 4 could be moved to any geometrically approachable point within that plane. By the crank mechanism 25 a circular closed path of movement 26 for the movable bar unit 4 is determined.

Figure 2:
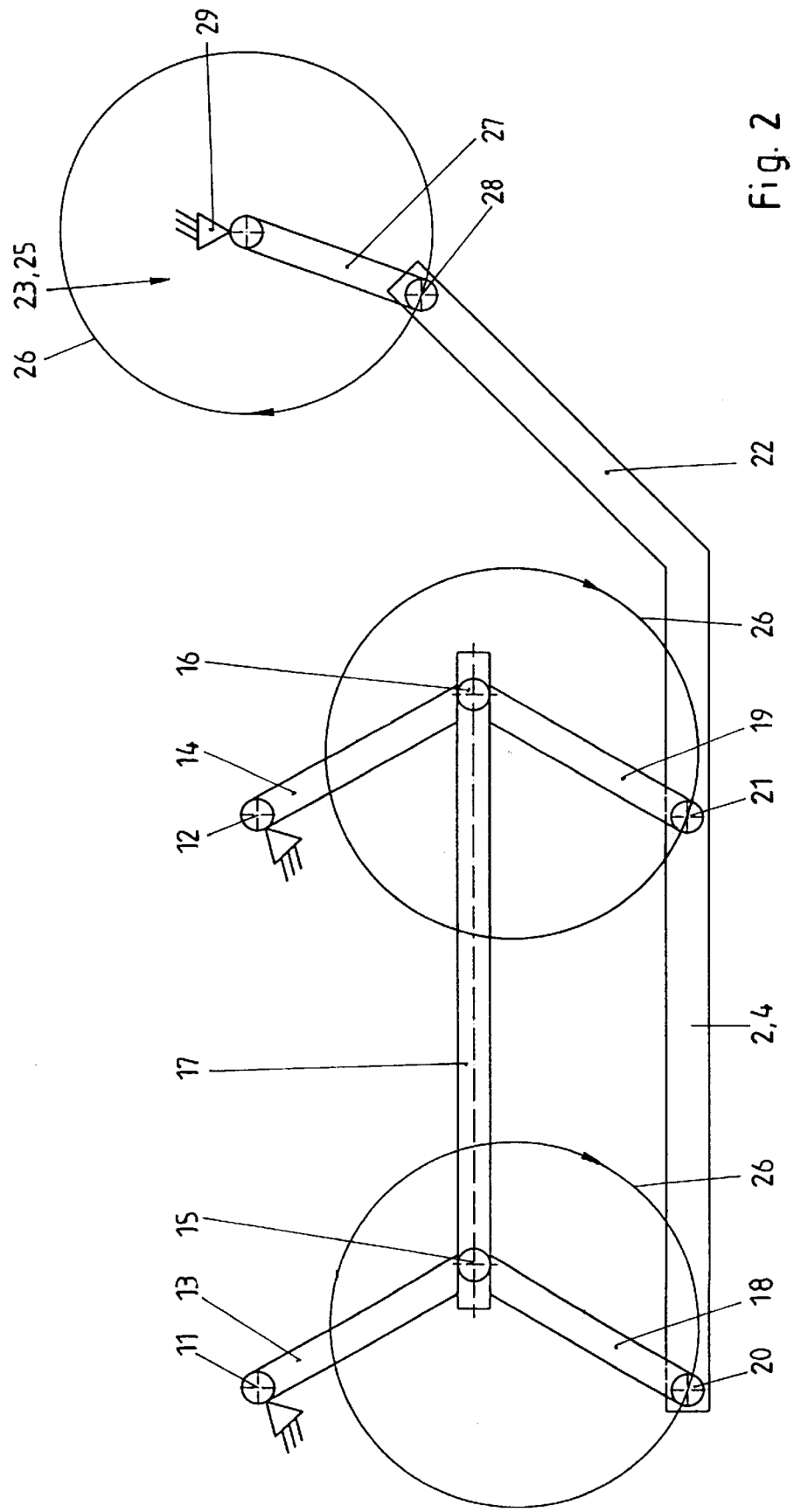
FIG. 2 is a side view of an arrangement of the movable bar unit and of the path of movement.

FIG. 2 illustrates the suspension arrangement and the one single drive 25 in more detail to further explain one concept of the present invention. It can be seen that the movable second bar unit 4 including the moving bars 2 is connected to the first and second parallelogram units being arranged in series. In this way, the movable bar unit 4 is suspended and supported by the first and second parallelogram units not to be moved out of the illustrated plane. The two first parallelogram rods 13 and 14 of the first parallelogram unit are pivotable to move circularly about the stationary bearings 11 and 12, respectively. Consequently, the coupling bar 17 being connected to the first parallelogram rods 13 and 14 is also guided to move on a circle. The two second parallelogram rods 18 and 19 of the second parallelogram unit are connected to the joints 15 and 16, respectively. The first parallelogram unit is formed by the parallelogram-like distributed pivoting elements 11, 12, 15 and 16 and the connecting elements 13, 14 and 17. The second parallelogram unit is formed by the pivoting elements 15, 16, 20 and 21 and the connecting elements 18, 19 and 17. It is to be understood that the lengths of the connecting elements are part of the parallelogram suspension. It is easy to understand that with this suspension the mobile joints 20 and 21 may be moved toward any point within reach. The drive 25 serves to limit this almost unlimited possibility of movement of the movable bar unit 4. The drive 25 includes a driving arm 27 including a cam 28, an eccentric device, or the like. At the same time, the cam 28 is a pivot bearing for the arm 22 being connected to the movable bars 2 of the movable bar unit 4. The driving arm 27 is supported by a stationary bearing 29 such that a circular path of movement 26 is attained. The drive 25 simultaneously and uniformly transmits the circular path of movement 26 onto the two joints 20 and 21 such that the joints 20 and 21 and the movable bar unit 4 carry out a circular movement corresponding to the path of movement 26.

Figure 3:
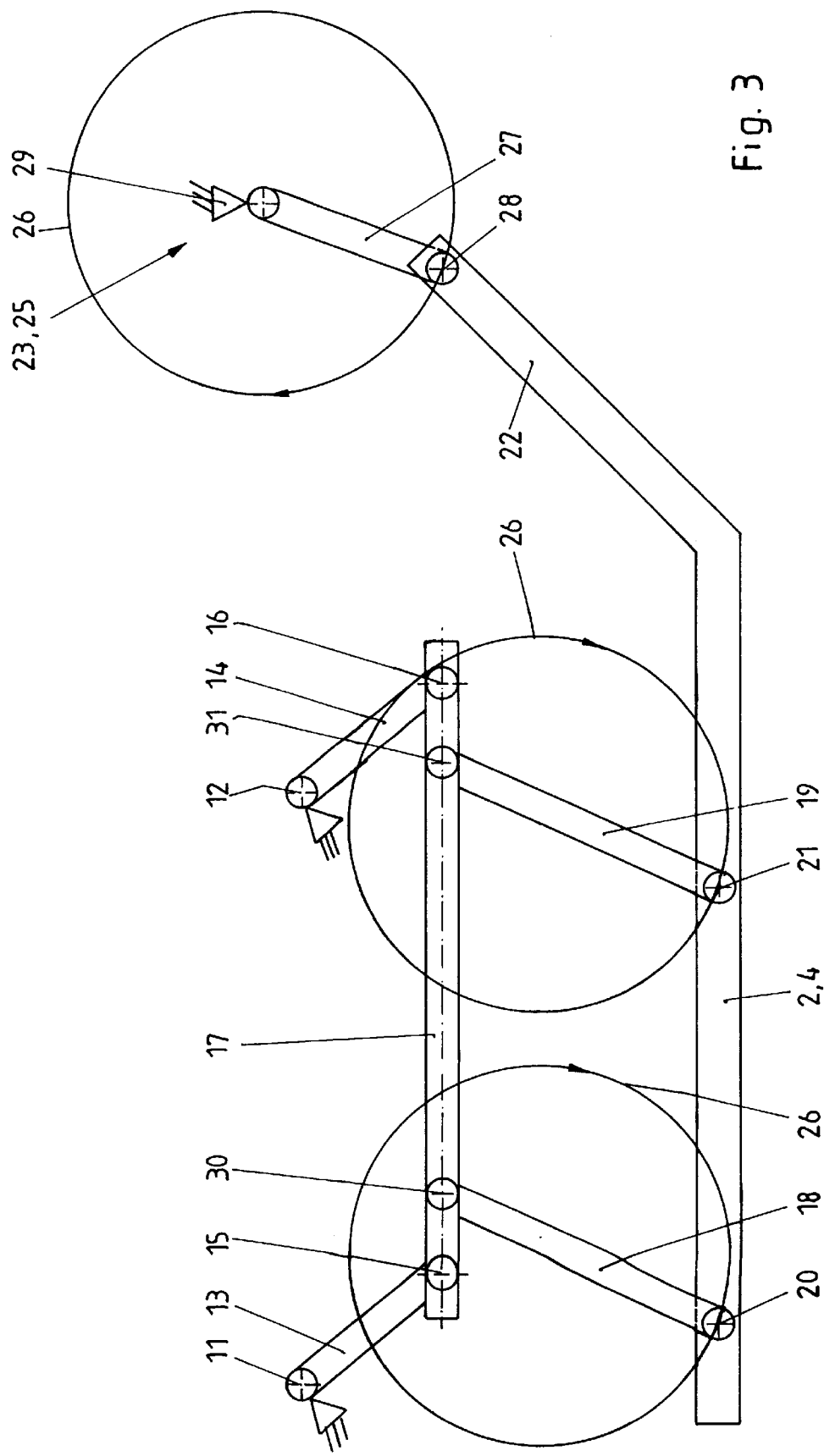
FIG. 3 is a side view of another arrangement of the movable bar unit and of the path of movement.

The embodiment according to FIG. 3 has a lot in common with the embodiment according to FIG. 2. The length of the second parallelogram rods 18 and 19 of the second parallelogram unit is identical. The length of the first parallelogram rods 13 and 14 of the first parallelogram unit is also identical but different from the length of the second parallelogram rods 18 and 19. The two second parallelogram rods 18 and 19 are not connected to the joints 15 and 16, but to separate joints 30 and 31, respectively, being arranged on the coupling bar 17. It is understood that these points 30, 31, 20 and 21 are also distributed and arranged to have the shape of a parallelogram and to guide the movable bar unit 4 in this way. Consequently, the movable bar unit 4 is guided along a circular path of movement 26.

Figure 4:
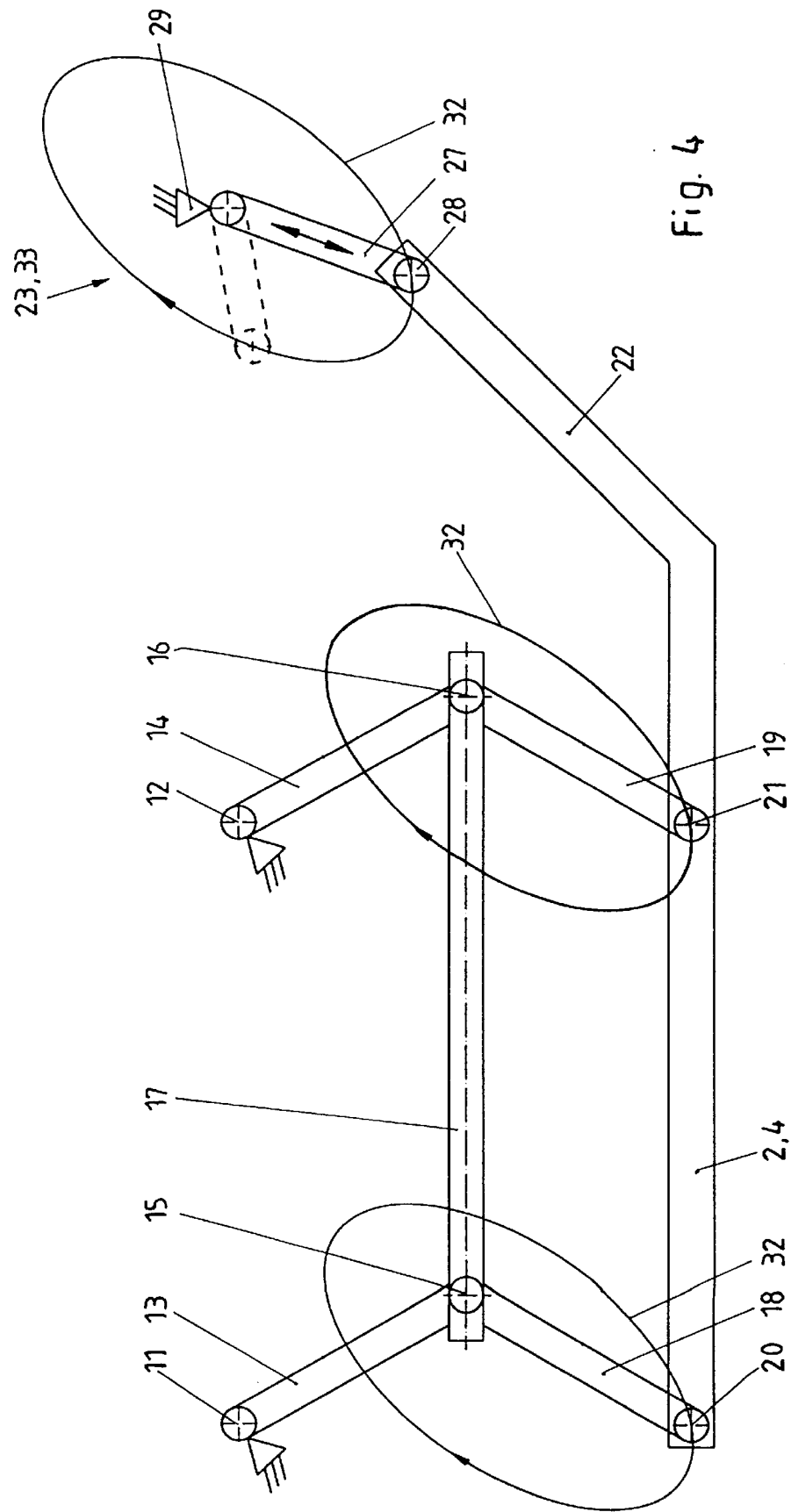
FIG. 4 is a side view of another arrangement of the movable bar unit and of an elliptical or ellipse-like path of movement.

The suspension arrangement of the embodiment illustrated in FIG. 4 is identical to the one illustrated in FIG. 2. The drive 25 is designed as a curved path drive 35. The cam 28 is guided on an elliptical path of movement 32. Consequently, the joints 20 and 21 and the movable bar unit 4 are moved parallel to themselves along an elliptical path of movement 32. The shape of the path of movement of the drive 25 determines the path of movement 32 along which the movable bar unit 4 is moved with respect to the stationary bar unit 3. The movable bar unit 4 is uniformly moved at all places. Consequently, all steps 8 have the same movement, and there is an identical conveying effect to articles to be removed from the fluid about the entire height of the apparatus.

Figure 5:
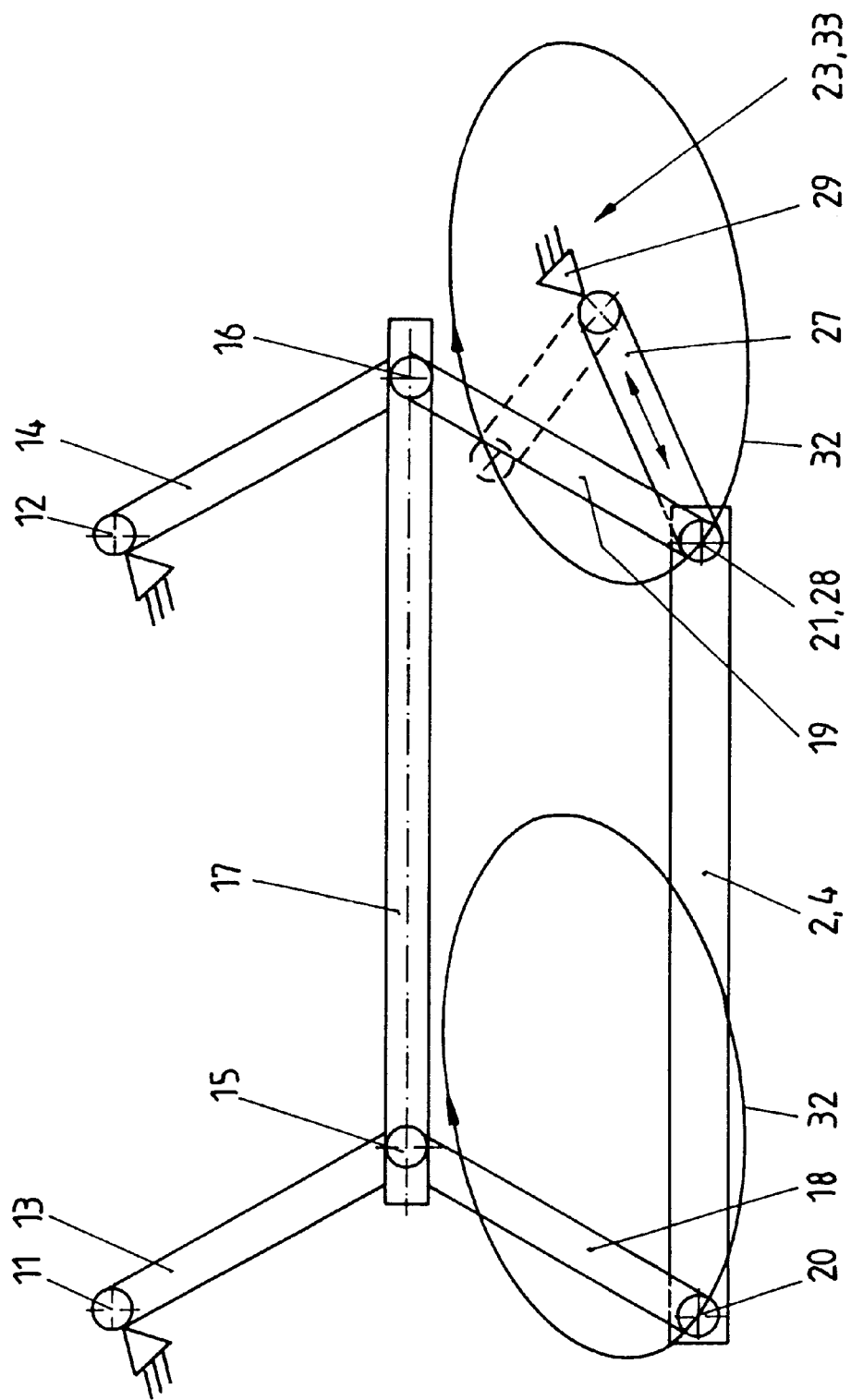
FIG. 5 is a side view of another arrangement of the movable bar unit and of the path of movement.

FIG. 5 illustrates another embodiment of the suspension of the movable bar unit 4 and of the drive 23. It can be seen from FIG. 5 that the drive 23 may also be directly connected to the bar unit 4 and to the joint 21, respectively. In this embodiment, there is no arm 22. In FIG. 5, the arrangement of the ellipse-like path of movement 32 with respect to the extension of the movable bar 2 has been changed compared to FIG. 4. The bigger semiaxis of the ellipse of the elliptical path of movement 32 is used to overcome the height of the step 8.

Many variations and modifications may be made to the preferred embodiments of the invention without departing substantially from the spirit and principles of the invention. All such modifications and variations are intended to be included herein within the scope of the present invention, as defined by the following claims.

I claim:

1. An apparatus for collecting and removing solid particles from a flowing fluid, comprising:
   a grid unit including:
      a plurality of stationary first bars being arranged to form a stationary first bar unit, each of said stationary first bars including a plurality of steps facing the flowing direction of the fluid; and
      a plurality of movable second bars being arranged to form a movable second bar unit, each of said movable second bars including a plurality of steps facing the flowing direction of the fluid, said stationary first bars and said movable second bars being arranged side by side to alternate;
   stationary bearings each having a pivot axis;
   a first parallelogram unit being connected to said stationary bearings to be pivotable about the pivot axes of said stationary bearings with respect to said stationary first bar unit;
   a second parallelogram unit being operatively connected to said first parallelogram unit and to said movable second bar unit, said first and second parallelogram unit being designed and arranged to guide said movable second bar unit in a plane with respect to said stationary first bar unit; and
   a drive being operatively connected to said movable second bar unit to move said movable second bar unit along a closed path of movement, said drive being operatively connected to said second bar unit.

2. The apparatus of claim 1, wherein said one single drive includes a crank mechanism.

3. The apparatus of claim 1, wherein said drive is designed as a curved path drive.

4. The apparatus of claim 2, wherein said drive is designed as a curved path drive.

5. The apparatus of claim 1, wherein said first parallelogram unit includes two first parallelogram rods having pivotable ends.

6. The apparatus of claim 5, wherein said second parallelogram unit includes two second parallelogram rods having pivotable ends.

7. The apparatus of claim 5, wherein said pivotable ends of said two first parallelogram rods of said first parallelogram unit are interconnected by a coupling bar.

8. The apparatus of claim 6, wherein said two first parallelogram rods of said first parallelogram unit are connected to said two second parallelogram rods of said second parallelogram unit by two common joints.

9. The apparatus of claim 6, wherein said one single drive is operatively connected to said movable second bar unit by being connected to one of said two second parallelogram rods.

10. The apparatus of claim 5, wherein said two first parallelogram rods have the same length.

11. The apparatus of claim 6, wherein said two second parallelogram rods have the same length.

12. The apparatus of claim 6, wherein said two first parallelogram rods have the same length as said two second parallelogram rods.

13. The apparatus of claim 6, wherein said two first parallelogram rods have a different length than said two second parallelogram rods.

14. The apparatus of claim 6, wherein said two second parallelogram rods are connected to one another by said movable second bar unit.

15. The apparatus of claim 1, wherein each of said steps includes a skeleton portion and a rising portion having the same dimensions, and wherein said first and second bar units are arranged to be inclined at an angle of 45 degrees.

16. A separating grid for collecting and removing solid particles from flowing waste water, comprising:
   a grid unit to extend into the flowing waste water including:
      a plurality of stationary first bars being arranged to form a first bar unit, each of said stationary first bars including a plurality of steps facing the flowing direction of the water and including a skeleton portion and a rising portion; and
      a plurality of movable second bars being arranged to form a movable second bar unit, each of said movable second bars including a plurality of steps facing the flowing direction of the fluid and including a skeleton portion and a rising portion, said stationary first bars and said movable second bars being arranged side by side to alternate;
   two stationary bearings each having a pivot axis;
   a first parallelogram unit being connected to said two stationary bearings to be pivotable in a plane about the pivot axes of said stationary bearings with respect to said stationary first bar unit;
   a second parallelogram unit being operatively connected to said first parallelogram unit and to said movable second bar unit, said first and second parallelogram unit being designed and arranged to guide said movable second bar unit in a plane with respect to said stationary first bar unit; and
   a drive being operatively connected to said movable second bar unit to move said movable second bar unit along a closed path of movement including an upwardly directed component of movement being greater than the vertical height of said steps of said first and second bars, said drive being operatively connected to said second bar unit.

17. A separating grid for collecting and removing solid particles from flowing waste water, comprising:
   a grid unit including:
      a plurality of stationary first bars being arranged to form a first bar unit, each of said stationary first bars including a plurality of steps facing the flowing direction of the water; and
      a plurality of movable second bars being arranged to form a movable second bar unit, each of said movable second bars including a plurality of steps facing the flowing direction of the fluid, said stationary first bars and said movable second bars being arranged side by side to alternate;
   a first parallelogram unit including:
      two first stationary bearings each having a pivot axis,
      two first parallelogram rods each being connected to one of said first stationary bearings to be pivotable in a plane about the pivot axes of said stationary bearings,
      a coupling bar for operatively coupling said two first parallelogram rods, and
      two first joints being connected to said coupling bar, each of said first joints being connected to one of said first parallelogram rods;
   a second parallelogram unit including:
      two second joints being connected to said movable second bar unit, and
      two second parallelogram rods each being connected to one of said second joints and each being operatively connected to said coupling bar, said first and second parallelogram unit being designed and arranged to guide said movable second bar unit in a plane with respect to said stationary first bar unit; and
   a drive to move said second bar unit with respect to said stationary first bar unit along a closed path of movement including an upwardly directed component of movement being greater than the vertical height of said steps of said first and second bars, said drive being operatively connected to said second bar unit.

18. The separating grid of claim 17, wherein each of said two second parallelogram rods is operatively connected to said coupling bar by said two first joints.

19. The separating grid of claim 17, wherein said second parallelogram unit further includes two third joints being connected to said coupling bar and to said two second parallelogram rods.

20. The separating grid of claim 17, wherein said two first parallelogram rods have the same length as said two second parallelogram rods.

* * * * *